(12) United States Patent
Kagiwada

(10) Patent No.: US 8,271,315 B2
(45) Date of Patent: Sep. 18, 2012

(54) PERSONAL INFORMATION UTILIZATION SYSTEM AND PERSONAL INFORMATION UTILIZATION PROGRAM FOR COMMODITY BASED IDENTIFICATION

(75) Inventor: Yoshimitsu Kagiwada, Kanagawa (JP)

(73) Assignee: Keysoft, Inc., Kanagawa (JP)

( * ) Notice: Subject to any disclaimer, the term of this patent is extended or adjusted under 35 U.S.C. 154(b) by 478 days.

(21) Appl. No.: 10/533,859

(22) PCT Filed: Nov. 5, 2002

(86) PCT No.: PCT/JP02/11502
§ 371 (c)(1),
(2), (4) Date: Jan. 26, 2006

(87) PCT Pub. No.: WO2004/042610
PCT Pub. Date: May 21, 2004

(65) Prior Publication Data
US 2006/0155646 A1 Jul. 13, 2006

(51) Int. Cl.
*G06Q 10/00* (2006.01)
(52) U.S. Cl. .......... 705/7.29; 726/30; 705/27.1; 705/69; 705/29; 709/203; 709/219; 709/229; 235/462.01; 700/96
(58) Field of Classification Search .......... 726/30
See application file for complete search history.

(56) References Cited

U.S. PATENT DOCUMENTS
7,031,934 B2 * 4/2006 Mori et al. .......... 705/26.7
7,233,955 B2 * 6/2007 Machida et al. .......... 1/1
(Continued)

FOREIGN PATENT DOCUMENTS
JP 2002-170035 6/2002
(Continued)

OTHER PUBLICATIONS
Ichikawa, A. et al., "Internet Commerce-Shin Doko to Gijutsu", 1st Edition, 2nd Print, May 10, 2000, Kyoritsu Shuppan Co., Ltd., 101-109, ISBN 4-320-09624-X.

*Primary Examiner* — Nathan Flynn
*Assistant Examiner* — Bryan Wright
(74) *Attorney, Agent, or Firm* — Woodcock Washburn LLP (57) ABSTRACT

The object of the present invention is to improve quality of service for customers by sharing and utilizing personal information on customers among variety of industries. In order to achieve the objective, the present invention comprises a personal information storage means (12), a communication means (8) to an external device and an information processing means (14) for controlling operation of each means thereof; wherein said personal information storage means (12) stores not only personal information on an information disclosing person, but also commodity provision information, etc. on commodity service which is provided for the information disclosing person for each information disclosing person of the personal information. And, the processing means (14) comprising: receiving personal information on an information disclosing person from an information search side terminal via the communication means (8), checking the received personal information with personal information stored in the personal information storage means (12), identifying an information disclosing person of the received personal information if the received personal information coincides with the personal information stored in the personal information storage means (12), as a result of the checking, reading out commodity provision information, etc. on the identified information disclosing person from the personal information storage means (12), transmitting said read out commodity provision information, etc. to the information search side terminal.

17 Claims, 8 Drawing Sheets

U.S. PATENT DOCUMENTS

| | | | |
|---|---|---|---|
| 7,284,063 B2 * | 10/2007 | Itabashi et al. | 709/229 |
| 7,523,049 B2 * | 4/2009 | Tokorotani | 705/16 |
| 2001/0037294 A1 * | 11/2001 | Freishtat et al. | 705/39 |
| 2002/0019817 A1 | 2/2002 | Matsui et al. | 707/1 |
| 2002/0103806 A1 | 8/2002 | Yamanoue | 707/100 |
| 2002/0184108 A1 * | 12/2002 | Hatakama et al. | 705/26 |
| 2003/0055730 A1 * | 3/2003 | Tokorotani | 705/16 |
| 2003/0070180 A1 * | 4/2003 | Katayama et al. | 725/133 |
| 2005/0240492 A1 * | 10/2005 | Grdina | 705/26 |

FOREIGN PATENT DOCUMENTS

JP  2002-329058  11/2002

* cited by examiner

PERSONAL INFORMATION UTILIZATION SYSTEM AND PERSONAL INFORMATION UTILIZATION PROGRAM FOR COMMODITY BASED IDENTIFICATION

TECHNICAL FIELD

The present invention relates to a personal information utilization system, etc., particularly to a personal information utilization system, etc. by utilizing off-premise communication networks such as the Internet.

BACKGROUND ART

A provider of commodity (service) has been managing its customers' information. In general, the provider handles the management of customers' personal information such as their names and contact addresses, and attribute information such as names of commodity items (names of services) which the provider has offered for the customers, as its costumers' information. And the provider makes efforts for improvement in quality of service for its customers, taking these commodity items (names of services) which have been provided for the customers into consideration.

However, in conventional cases, there has been such an inconvenience that customers' information has not been managed among a plurality of providers, so that each provider cannot grasp which commodity services other providers have provided for them, resulting in miss-timing of their service provision for the customers. For example, generally, those who have purchased a house will often purchase furniture, bedding and household electric appliances for the new house as well. Therefore, it is preferable for a furniture vendor, a bedding vendor and a household electric appliances vendor to provide sales of furniture, bedding goods and household electric appliances for the prospective house purchasers at the same time of their purchase of a house. However, it is difficult for the furniture vendor, the bedding vendor and the household electric appliances vendor to identify those prospective house purchasers, resulting in miss-timing of their service provision for the prospective house purchasers.

The object of the present invention is to improve the inconvenience in the conventional cases as mentioned above, in particular, to improve quality of service for customers by sharing and utilizing personal information on customers among variety of industries.

DISCLOSURE OF THE INVENTION

The present invention comprises a personal information storage means, a communication means to an external device and an information processing means for controlling operation of each means thereof;

wherein said personal information storage means stores not only personal information on an information disclosing person, but also commodity provision information, etc. on commodity service which is provided for the information disclosing person for each information disclosing person of the personal information.

And, the processing means employs the following constitution comprising: a) receiving personal information on an information disclosing person from an information search side terminal via the communication means, b) checking the received personal information with personal information stored in the personal information storage means, c) identifying an information disclosing person of the received personal information if the received personal information coincides with the personal information stored in the personal information storage means, as a result of the checking, d) reading out commodity provision information, etc. on the identified information disclosing person from the personal information storage means, e) transmitting said read out commodity provision information, etc. to the information search side terminal.

It should be noted that an "information searcher" means any one who searches information, such as a vendor, a retailer and a banking agency; and an "information disclosing person" means any one who discloses information, such as customers, employees and consumers of a sales vendor. Further, "personal information" means information pertinent to an information disclosing person, such as the information disclosing person's ID number, contact address, post address, name, age and family-make up. "Commodity provision information, etc" means information pertinent to commodity service which is provided for an information disclosing person, such as attribute information on commodity (service) and information on a provider of commodity (service). For example, if a provided commodity is a blanket, attribute information includes information such as a commodity item (baby blanket) etc., and information on the provider includes information such as a name of a bedding vendor and a date when the vendor provided the item.

According to the present invention, first, the processing means receives personal information on an information disclosing person from the information search side terminal via the communication means, and checks the received personal information with personal information stored in the personal information storage means. Then, as a result of the checking by the processing means, if the received personal information coincides with the personal information stored in the personal information storage means, an information disclosing person of the received personal information is identified, and at the same time, commodity provision information, etc. of said identified information disclosing person is read out from the personal information storage means, and said read out commodity provision information, etc. is transmitted to the information search side terminal.

Also, the present invention comprises a personal information storage means, a communication means to an external device and an information processing means for controlling operation of each means thereof; said personal information storage means storing not only personal information on an information disclosing person but also commodity provision information, etc. of commodity service which is provided for the information disclosing person for each information disclosing person of the personal information.

And, said processing means employs the following constitution comprising:

a) receiving information included in commodity provision information, etc. from an information search side terminal via the communication means, b) checking the received information included in the commodity provision information, etc. with commodity provision information, etc. stored in the personal information storage means. c) identifying an information disclosing person associated with said commodity provision information, etc. if the received information included in the commodity provision information, etc. partially or completely coincides with the commodity provision information, etc. stored in the personal information storage means, as a result of the checking, d) reading out one or more personal information on the identified information disclosing person or persons from the personal information storage means, e) transmitting said read out personal information on the information disclosing person or persons to the information search side terminal.

According to the above constitution, the processing means first receives information included in the commodity provision information, etc. from the information search side terminal via the communication means; and checks the received information included in the commodity provision information, etc. with commodity provision information, etc. stored in the personal information storage means. Then, as a result of the checking, if the received information included in the commodity provision information, etc. partially or completely coincides with the commodity provision information, etc. stored in the storage means, the processing means identifies information disclosing person or persons associated with said commodity provision information, etc., one or more personal information on the identified information disclosing person or persons is read out from the personal information storage means, and said read out personal information on the information disclosing person or persons is transmitted to the information search side terminal.

The commodity provision information, etc. registered in the personal information storage means refers to such information in which the processing means associates personal information of the information disclosing person or persons and commodity provision information, etc., and receives said associated information from the information register side terminal via the communication means; checks the received personal information with personal information stored in the personal information storage means; and as a result of the checking, if the received personal information coincides with the personal information stored in the personal information storage means, an information disclosing person of the received personal information is identified; and the commodity purchasing information etc. received for each identified information disclosing person is registered in the personal information storage means.

It should be noted that an "information registering person" means any one who registers commodity provision information, etc., such as a vendor, a retailer and a moving agent.

An "information searching person" includes at least a manufacturer, a sales vendor, a service trader, a self-governing body and an education foundation.

In addition, the personal information on the information disclosing person registered in the personal information storage means is such information that the processing means is allowed to receive information on disclosure limits representing disclosure limits for the personal information on the information disclosing persons, from the information disclosure side terminal via the communication means and that the personal information storage means is allowed to manage in accordance with the received information on disclosure limits.

It should be noted that "information on disclosure limits" is information on permitting limits on disclosure of disclosing person's own personal information, which is included in the personal information on the information disclosing person such as an ID number and a name. It is the information, for example, which permits disclosure of the ID number and the name, or disclosure of the ID number only.

Furthermore, the present invention is used for a personal information utilization system which comprises a personal information storage means, a communication means to an external device and an information processing means for controlling operation of each means thereof; and said personal information storage means stores not only personal information on information disclosing person, but also commodity provision information, etc. on commodity service which is provided for the information disclosing person for each information disclosing person of the personal information.

Further, said personal information utilization system employs the following constitution that allows the processing means: a) to receive personal information on an information disclosing person from an information search side terminal via the communication means, b) to check the received personal information with personal information stored in the personal information storage means, c) to identify an information disclosing person of the received personal information if the received personal information coincides with the personal information stored in the personal information storage means, as a result of the checking, d) to read out the commodity provision information, etc. on the identified information disclosing person from the personal information storage means, e) to transmit said read out commodity provision information, etc. to the information search side terminal.

Moreover, the present invention is used for a system which comprises a personal information storage means, a communication means to an external device and an information processing means for controlling operation of each means thereof; and said personal information storage means stores not only personal information on an information disclosing person, but also storing commodity provision information, etc. on commodity service which is provided for the information disclosing person for each information disclosing person of the personal information.

Further, said system employs such a constitution that allows the processing means: a) to receive information included in commodity provision information, etc. from an information search side terminal via the communication means, b) to check the received information included in the commodity provision information, etc. with commodity provision information, etc. stored in the personal information storage means, c) to identify a information disclosing person associated with said commodity provision information, etc. if the received information included in the commodity provision information, etc. partially or completely coincides with the commodity provision information, etc. stored in the personal information storage means, as a result of the checking, d) to read out one or more personal information on the identified information disclosing person or persons from the personal information storage means, e) to transmit said read out personal information on the information disclosing person or persons to the information search side terminal.

Further, the commodity provision information, etc. registered in the personal information storage means is such information in which the processing means is allowed: to associates personal information of the information disclosing person and commodity provision information, etc.; to receive said associated information from the information register side terminal via the communication means; to check the received personal information with personal information stored in the personal information storage means; to identify an information disclosing person of said received personal information, as a result of the checking, if the received personal information coincides with the personal information stored in the personal information storage means; and to register the commodity purchasing information, etc. received for each identified information disclosing person in the personal information storage means.

An "information searching person" includes at least a manufacturer, a vendor, a service trader, a self-governing body or an education foundation.

In addition, the personal information on the information disclosing person registered in the personal information storage means is such information that the processing means is allowed to receive information on disclosure limits representing disclosure limits for the personal information on the information disclosing persons, from the information disclosure side terminal via the communication means and that the personal information storage means is allowed to manage in accordance with the received information on disclosure limits.

Thereby, it is aimed to accomplish the object as mentioned above.

BEST MODE FOR CARRYING OUT THE INVENTION

A description will be provided on one embodiment according to the present invention, in accordance with FIGS. 1 to 8 as follows.

Figure 1:
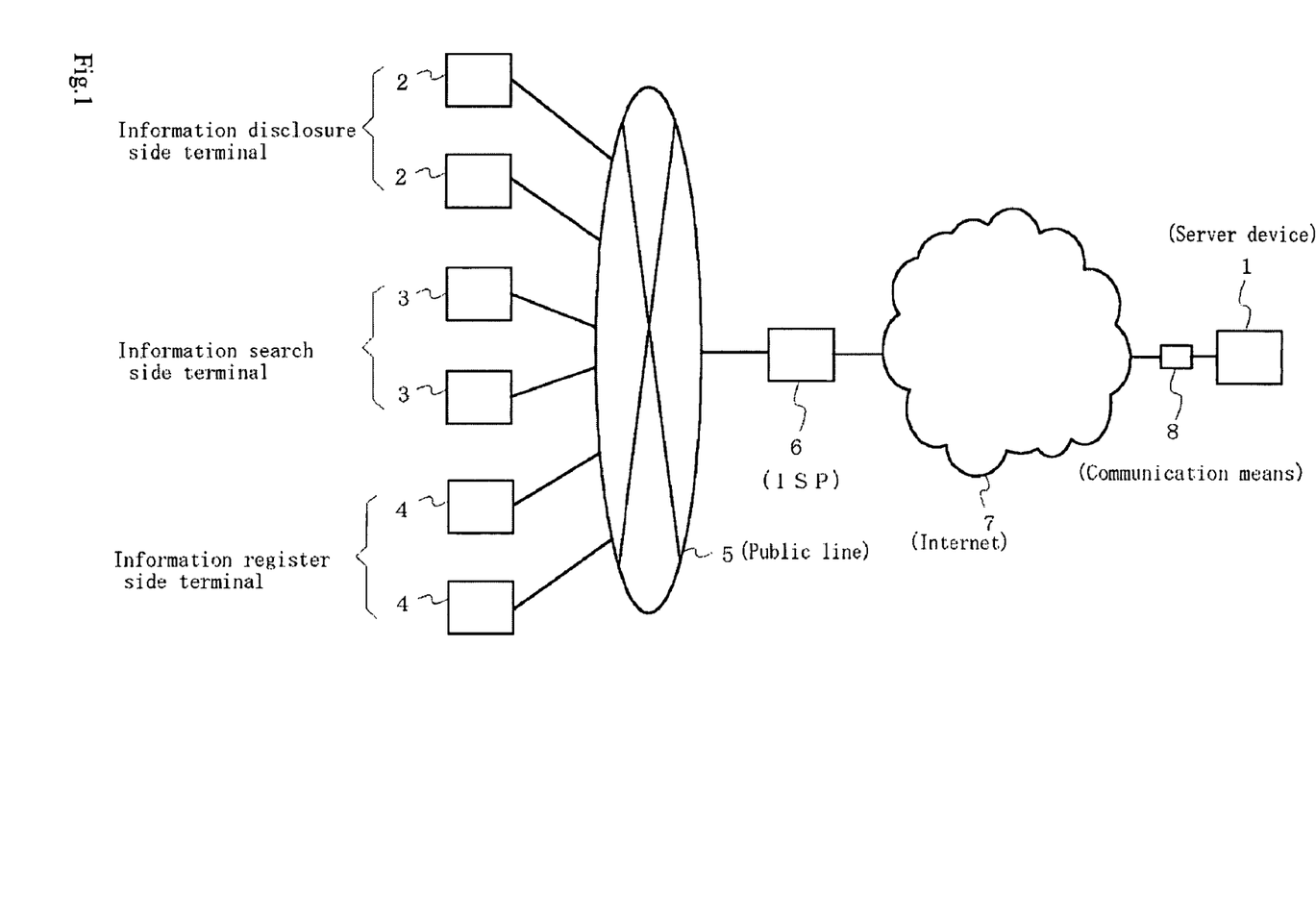
FIG. 1 is a block diagram of a system outline showing one embodiment according to the present invention.

FIG. 1 is a block diagram showing a system outline.

In the system of FIG. 1, an information disclosure side terminal 2, an information search side terminal 3 and an information register side terminal 4 are respectively connected through public lines 5 to an internet service provider (ISP) 6, from which said terminals 2 to 4 are further connected through a dedicated line to the Internet 7. Meanwhile, a server device 1 is connected via a communication means 8 to the Internet 7.

It should be noted that the information disclosure side terminal 2, the information search side terminal 3 and the information register side terminal 4 are respectively, for example, a personal computer, a mobile telephone, an interactive television set, a portable information terminal or home game machine, etc. An information disclosing person at the information disclosure side terminal 2 can be a person who discloses his or her own personal information, such as a customer of a housing vendor, a customer of a bedding vendor and a customer or consumer of a moving agent. An information searching person at the information search side terminal 3 can be a person who searches information, such as a furniture vendor, a household electric appliances vendor and a telephone company. And, an information registering person at the information register side terminal 4 can be a person who registers provision information on commodity service, such as a bedding vendor and a moving agent. An information searching person can be an information registering person as well.

The information disclosure side terminal 2, the information search side terminal 3 and the information register side terminal 4 can access to an appropriate web page provided by the server device 1 so as to use the present system. Access limits may be provided by use of personal authentication for the sake of improvement in security, etc.

Figure 2:
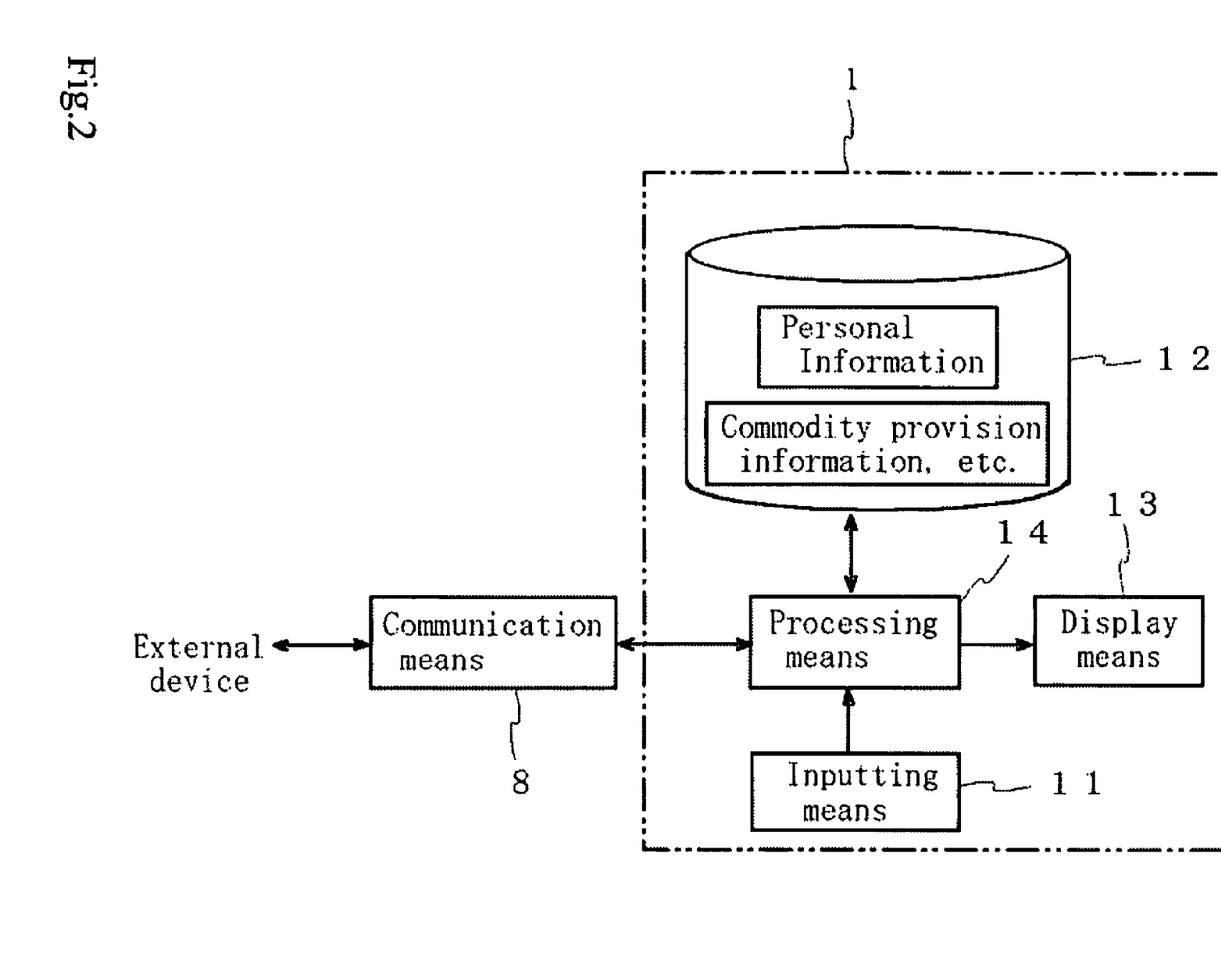
FIG. 2 is a block diagram showing a structure of the server device disclosed in FIG. 1

The following is a detailed description on a structure of the above mentioned server device 1.

FIG. 2 is a block diagram showing the structure of said server device 1.

In FIG. 2, the server device 1 comprises an information inputting means 11, a personal information storage means 12, an information display means 13, a communication means 8 to an external device and a processing means 14 for controlling operation of each means thereof.

The information storage means 12 stores not only personal information on the information disclosing person, but also commodity provision information, etc. on commodity service which have been provided for the information disclosing persons for each information disclosing person of the personal information. Now, in the present embodiment, a description will be provided in the case of commodity provision information on commodity, mainly based on commodity provision information, etc.

The processing means 14 includes CPU, etc. for controlling the entire operation of the server device 1. However, the processing means 14 may include a plurality of computers for distribution processing, not limited to the case of a constitution by a singular CPU. The personal information storage means 12 is a hard disk or the like, for example. However, the personal information storage means 12 may physically be either singular or plural. The communication means 8 is a router, for example. The inputting means 11 is keyboards or the like, for example. The display means 14 is a computer display or the like, for example.

The following is a specific description on registration of personal information and commodity provision information which are stored in the personal information storage means 12.

Of the two information, the personal information will be registered as follows: First, the processing means 14 receives information on disclosure limits representing disclosure limits for personal information on an information disclosing person (e.g. request for limits on ID number and name) from the information disclosure side terminal 2 via the communication means 8.

Next, the processing means 14 manages the personal information (e.g. ID number and name) in the personal information storage means 12 in accordance with the received information on disclosure limits.

In addition, the registration of commodity provision information will be performed as follows. First, the processing means 14 associates personal information of the information disclosing person or persons (e.g. ID number) and commodity provision information (e.g. provision information on bedding goods), and receives said associated information from the information register side terminal 4 via the communication means 8.

And, the processing means 14 checks the received personal information with personal information stored in the personal information storage means 12.

Then, the processing means 14, as a result of the checking, if the received personal information coincides with the personal information stored in the personal information storage means 12, identifies an information disclosing person of the received personal information.

Thereafter, the processing means 14 registers the received commodity provision information for each identified information disclosing person in the personal information storage means 12.

Figure 3:
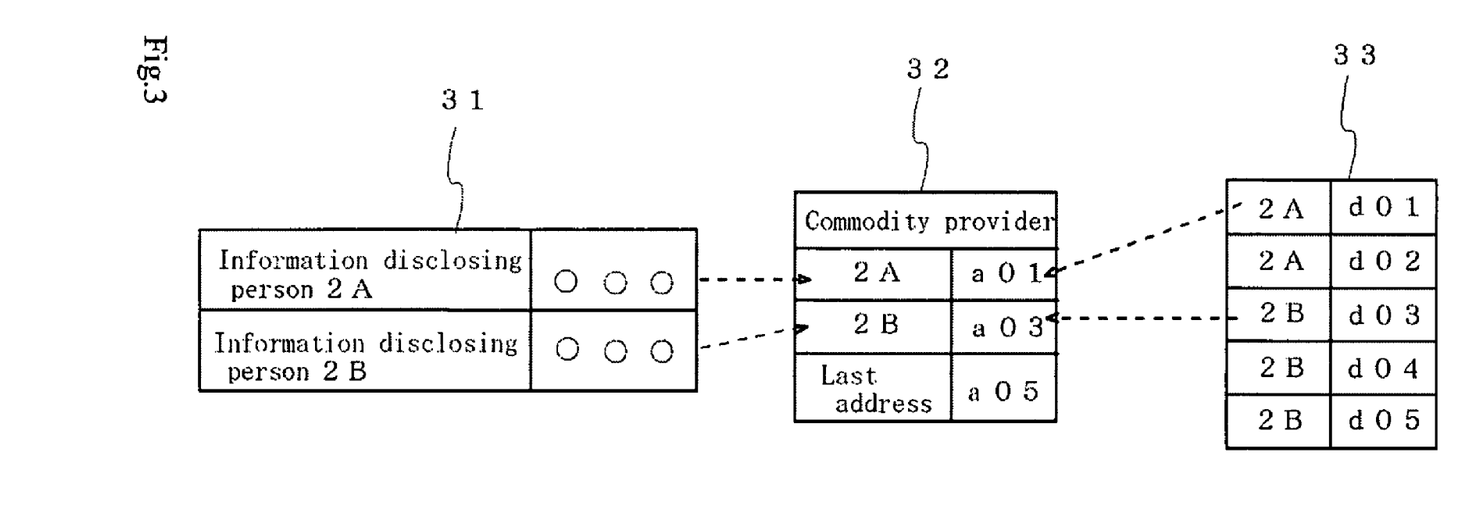
FIG. 3 is an explanatory diagram to explain data structure of the personal information storage means disclosed in FIG. 2.

Now, one example will be provided on data structure of personal information and commodity provision information which are stored in the personal information storage means 12, in accordance with FIG. 3.

As shown in FIG. 3, the personal information storage means 12 actually stores an information disclosing person table 31, commodity provider file 32, and attribute information on commodity file 33 in an appropriate region thereof.

In the information disclosing person table 31, personal information (e.g. ID numbers and names) corresponding to an information disclosing person 2A and an information disclosing person 2B is associated with each information disclosing person respectively. Further, in the attribute information file 33, attribute information on commodity is stored in series in such a manner that the attribute information on commodity (e.g. attribute information on blanket, etc.), d01 to d02, which has been provided for the information disclosing person 2A is followed by the attribute information on commodity (e.g. attribute information on furniture, etc.), d03 to d05, which has been provided for the information disclosing person 2B. In the provider file 32, the addresses, a01 and a03, for each information disclosing person are stored in each corresponding pointer region. It should be noted that the personal information storage means 12 also stores a file for accumulating attribute information on commodity corresponding to every commodity provider (not shown in the drawing) in an appropriate region thereof. It should also be noted that data structure of the personal information and the commodity provision information is to be standardized in conformity with XML (Extensible Markup Language).

For a further detailed description, the processing means 14, according to the present embodiment, is allowed to receive personal information on an information disclosing person (e.g. ID number of the information disclosing person 2A) from the information search side terminal 3 via the communication means 8.

And, the processing means 14 is allowed to check the received personal information with personal information stored in the personal information storage means 12.

Then, as a result of the check, the processing means 14 is allowed, if identification is achieved on the received personal information with the personal information stored in the personal information storage means 12, to identify an information disclosing person of said received personal information.

The processing means 14, is allowed, further, to read out commodity provision information, etc. (e.g. information on a provider or attribute information of the blanket) on the identified information disclosing person from the personal information storage means 12.

Thereafter, the processing means 14 is allowed to transmit the read out commodity provision information, etc. to the information search side terminal 3.

Figure 4:
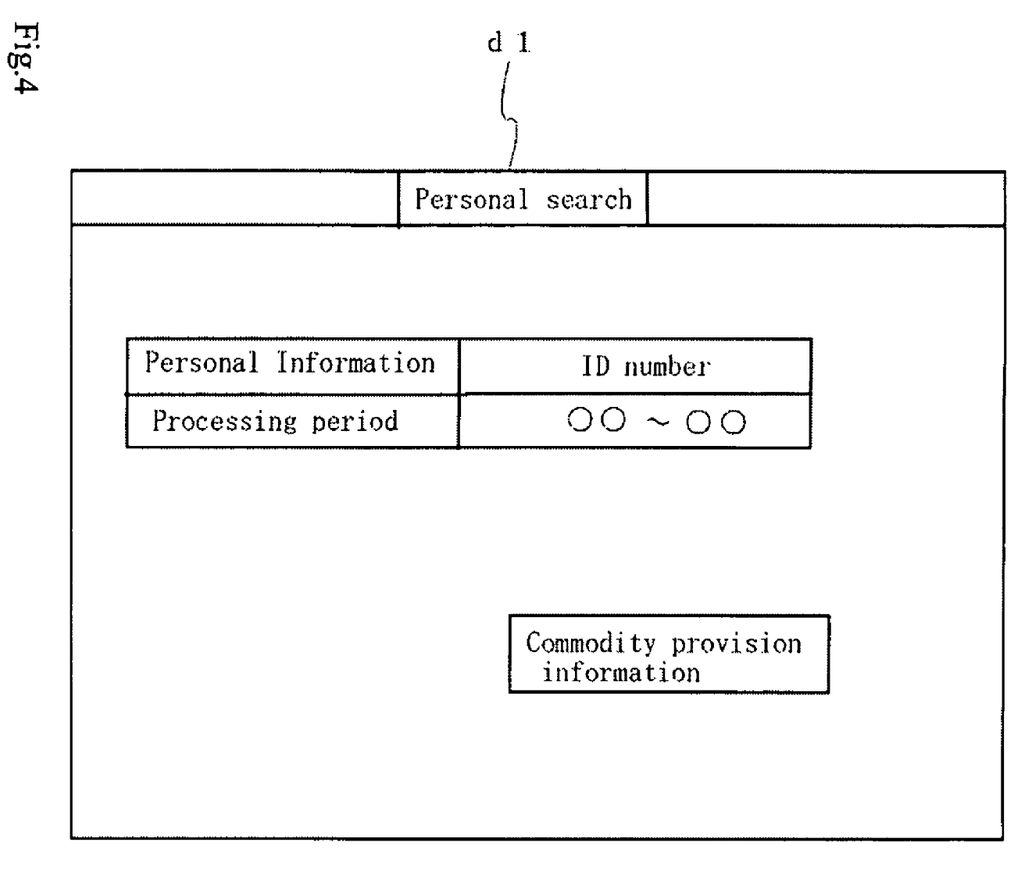
FIG. 4 is a block diagram of a personal search interface displayed on the information disclosure side terminal.

Now, in accordance with FIG. 4, one example will be provided on a personal search interface d1 including commodity provision information which the processing means 14 transmits to the information search side terminal 3.

In FIG. 4, the personal search interface d1 is a window displayed on the information search side terminal 3. The personal search interface d1 includes personal information (key), process period, and commodity provision information (search result).

A further detailed description will be provided. The processing means 14 is allowed to receive information included in commodity provision information (e.g. name of a bedding vendor) from the information search side terminal 3 via the communication means 8.

And, the processing means 14 is allowed to check the received information included in the commodity provision information with commodity provision information stored in the personal information storage means 12.

Then, as a result of the check, if identification is achieved on the received information included in the commodity provision information partially or completely with the commodity provision information stored in the personal information storage means 12, the processing means 14 is allowed to identify information disclosing person or persons (e.g. information disclosing persons 2A and 2B) associated with said commodity provision information.

Further, the processing means 14 is allowed to read out one or more personal information on the identified information disclosing person or persons (e.g. each ID number and name of the information disclosing persons 2A and 2B) from the personal information storage means 12, Thereafter, the processing means 14 is allowed to transmit said read out personal information on the information disclosing person or persons to the information search side terminal 3.

Figure 5:
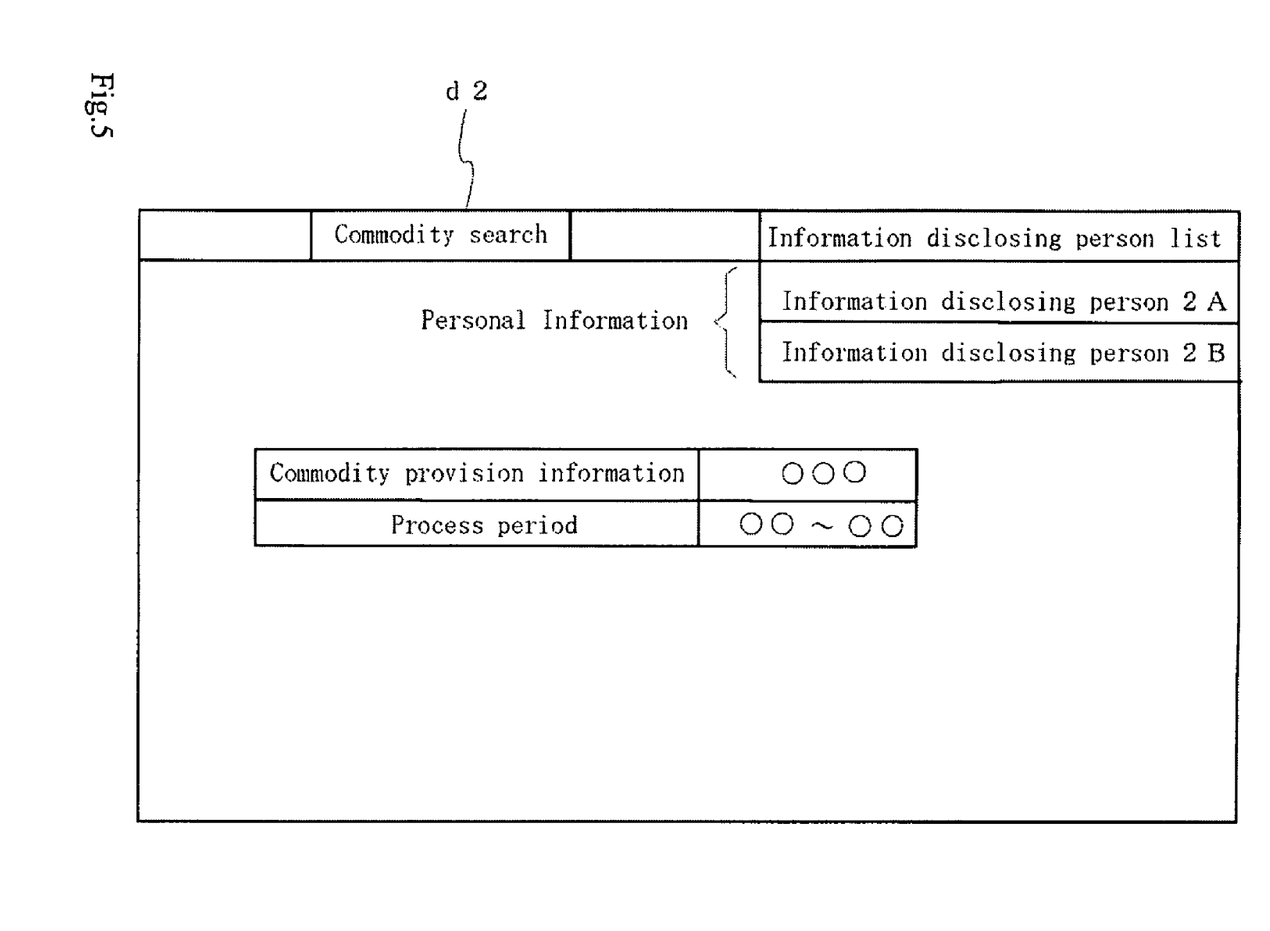
FIG. 5 is a block diagram of a commodity search interface displayed on the information disclosure side terminal.

Now, in accordance with FIG. 5, one example will be provided on a commodity search interface d2 including personal information which the processing means 14 transmits to the information search side terminal 3.

In FIG. 5, this commodity search interface d2 is a window displayed on the information search side terminal 3. The commodity search interface d2 includes commodity provision information (key), process period, and personal information (search result).

The present embodiment is provided with all the other known constitutions and functions required for a server device 1 on the Internet, as well.

Figure 6:
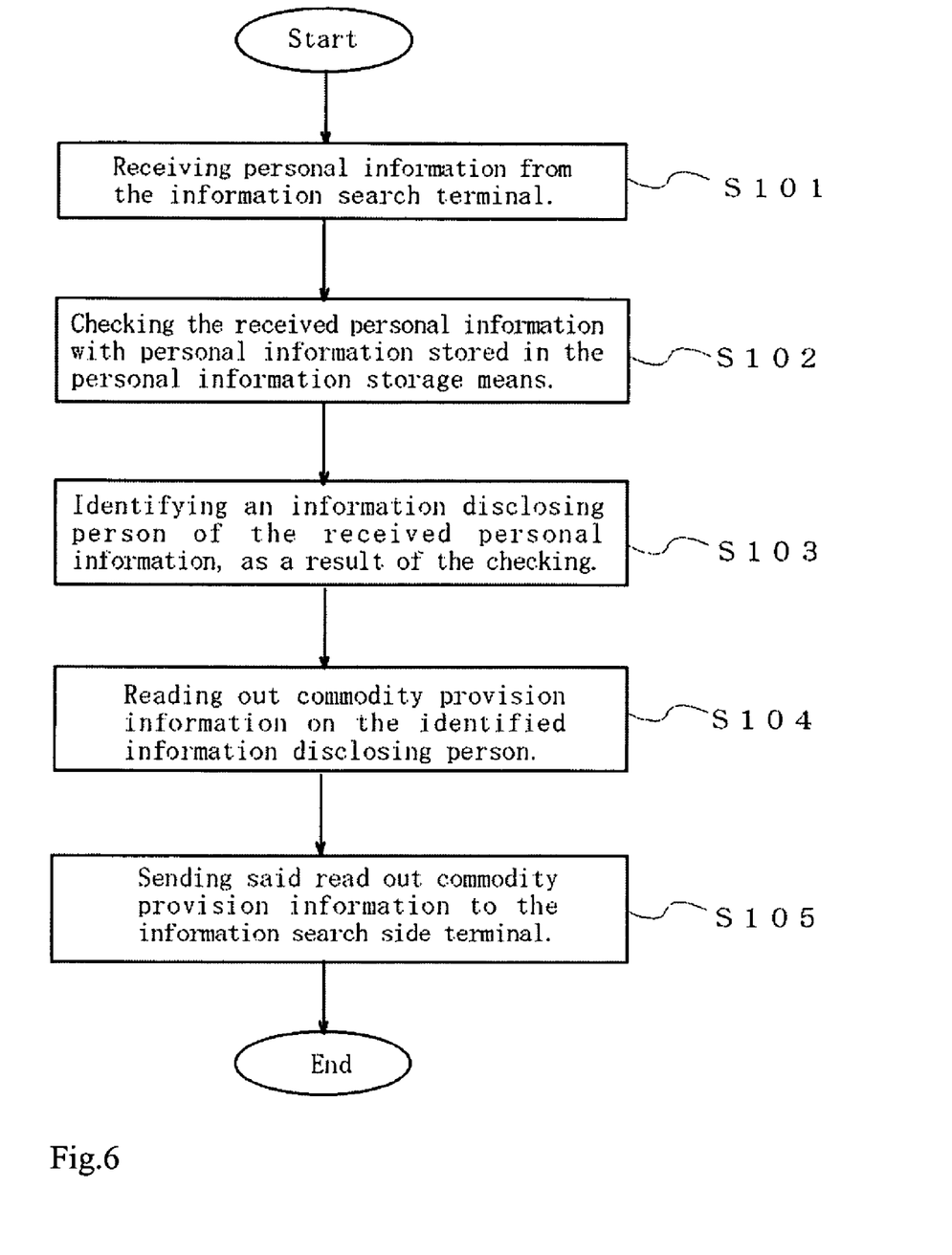
FIG. 6 is a flow chart showing operation of the server device in the case of receiving personal information from the information search side terminal disclosed in FIG. 1
Figure 7:
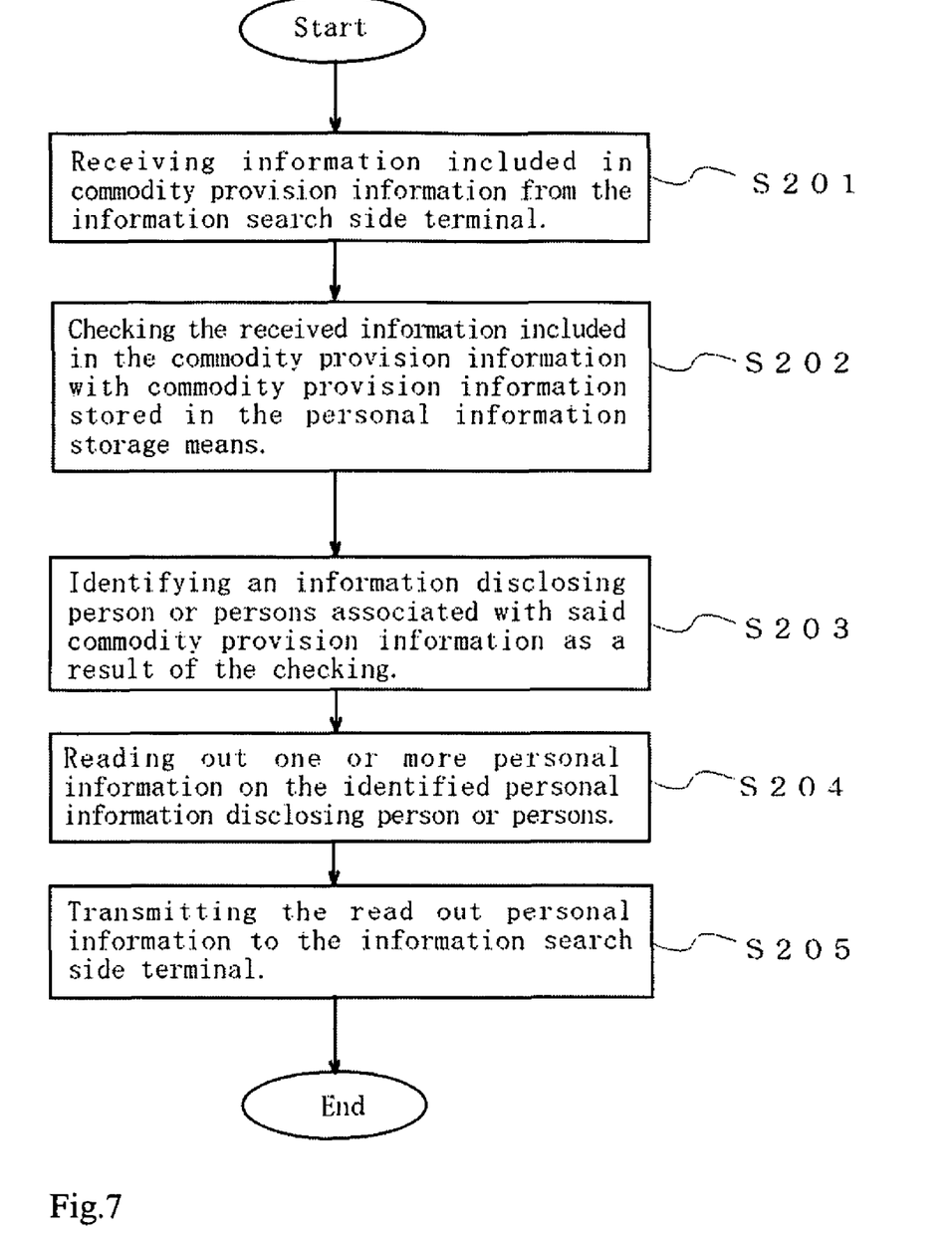
FIG. 7 a flow chart showing operation of the server device in the case of receiving commodity provision information from the information search side terminal disclosed in FIG. 1
Figure 8:
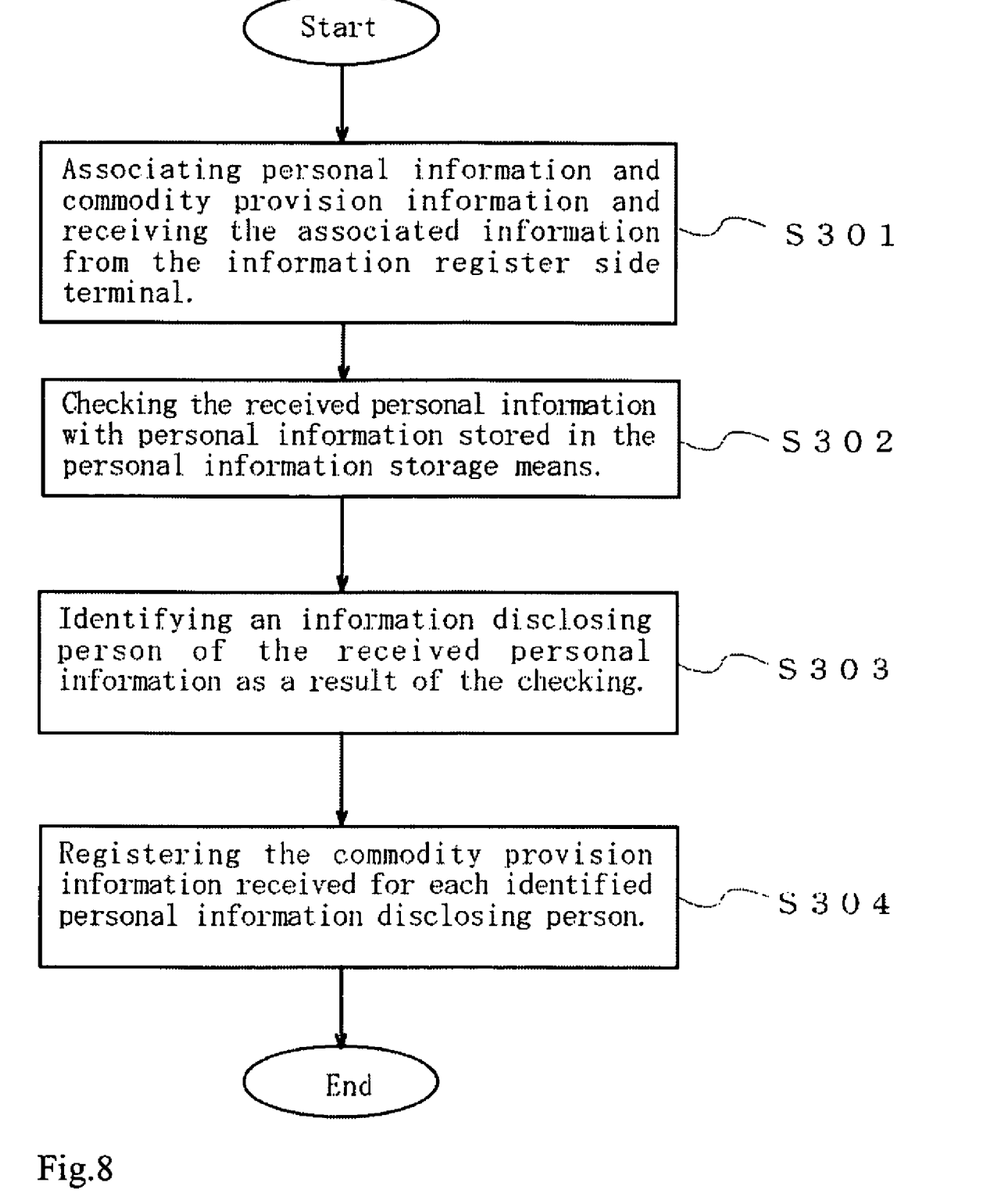
FIG. 8 is a flow chart showing operation of the server device in the case of receiving commodity provision information from the information resister side terminal disclosed in FIG. 1

Next, a description will be provided on operation of above mentioned server device 1, in accordance with FIGS. 6 to 8. First, a description will be given on operation of the server device 1 when said server device 1 receives personal information from the information search side terminal 3, in accordance with FIG. 6. In this case, it is also possible to realize the operation of the server device 1 as described below by use of software.

In FIG. 6, first, the processing means 14 receives personal information on an information disclosing person from the information search side terminal 3 via the communication 8 (S101).

Following the above step, the processing means 14 checks the received personal information with personal information stored in the personal information storage means 12 (S102).

Next, the processing means 14, as a result of the check, if identification is achieved on the received personal information with the personal information stored in the personal information storage means 12, identifies an information disclosing person of said received personal information (S103).

Further, the processing means 14 reads out commodity provision information on the identified information disclosing person from the personal information storage means 12 (S104).

Thereafter, the processing means 14 transmits said read out commodity provision information to the information search side terminal 3 (S105).

At this time, on the information search side terminal 3, said commodity provision information is displayed in an appropriate region of the personal search interface d1 including the commodity provision information transmitted from the server device 1 (see FIG. 4).

As described above, according to the present system, since the processing means 14 transmits the commodity provision information on the personal information disclosing person coinciding with the personal information received from the personal information search side terminal 3 thereto, with a search using personal information on a specific information disclosing person as a key, the information searching person can make a confirmation on commodity provision information which has been provided for the specific information disclosing person as a search result. In general, an information disclosing person is likely to be provided with commodities depending on his or her lifestyle and preference. Hence, the information searching person can grasp suitable commodities for the information disclosing person depending on his or her lifestyle and preference from the commodity provision information of the search result, whereby the information searching person can ensure to provide the specific information disclosing person with information on commodities highly encouraging his or her desire for acquiring them in good timing. In particular, this can be very useful for the information searching person to have a good chance for acquiring a new customer if the information disclosing person is not a customer of the information searching person.

On the other hand, the information disclosing person can be provided with information on commodities highly encouraging his or her desire for purchasing them in good timing from the information searching person, so that it can be likely to provide a smooth trading between the information disclosing person and the information searching person.

For example, if one bedding vendor, from a search result for personal information on an information disclosing person, obtains provision information on a commodity (e.g. baby blanket) which the information disclosing person has purchased from another bedding vendor, as a search result, the bedding vendor can provide an appropriate suggestion on a commodity such as child's blanket for the information disclosing person a several years ahead, with taking the information disclosing person's lifestyle and preference into account. On the other hand, the information disclosing person can be provided with suggestions on commodities highly encouraging his or her desire for acquiring them, so that it will be likely to provide a smooth trading with blankets between the information disclosing person and the information searching person. In this case, the information disclosing person will not be provided with sales of commodities in which the information disclosing person has no interests. Therefore, the bedding vendor can acquire a new customer.

Next, a description will be provided on operation of the server device 1 when the server device 1 receives commodity provision information from the information search side terminal 3, in accordance with FIG. 7. In this case, it is also possible to realize the operation of the server device 1 as described below by use of software.

First, the processing means 14 receives information included in commodity provision information from the information search side terminal 3 via the communication-means 8 (S201).

Then, the processing means 14 checks the received information included in the commodity provision information with commodity provision information, etc. stored in the personal information storage means 12 (S202).

Next, as a result of the checking, if the received information included in the commodity provision information partially or completely coincides with the commodity provision information stored in the personal information storage means 12, the processing means 14 identifies an information disclosing person or persons associated with said commodity provision information (S203).

Further, the processing means 14 reads out one or more personal information on the identified information disclosing person or persons (personal information managed in the personal information storage means 12 in accordance with information on disclosure limits received from the information disclosure side terminal 2) from the personal information storage means 12 (S204).

Thereafter, the processing means 14 transmits said read out personal information on the information disclosing person or persons to the information search side terminal 3 (S205).

At this time, on the information search side terminal 3, said personal information is displayed in an appropriate region of the commodity search interface d2 including personal information transmitted from the server device 1 (see FIG. 5).

As described above, according to the present system, since the processing means 14 transmits personal information on the personal information disclosing person or persons in association with the commodity provision information received from the personal information search side terminal 3 thereto, the information searching person can make a confirmation on the personal information on the information disclosing person or persons as a search result, by using commodity provision information on a specific commodity as a key. In general, if an information disclosing person (e.g. consumer) is provided with a specific commodity, he or she is likely to need provision of other commodities as well. Therefore, the information searching person can grasp a specific information disclosing person or persons who had needs on specific commodities from the search result, whereby the information searching person can provide the specific information disclosing person or persons with services for commodities highly encouraging their desire for acquiring them in good timing. On the other hand, the information disclosing person or persons can be provided with the services for the commodities highly encouraging their desire for purchasing them (e.g. explanation on the commodities), so that it can be likely to provide a smooth trading between the information disclosing person or persons and the information searching person. In particular, within industries having strong ties with each other, it is useful to obtain commodity provision information from other industries because it enables them to grasp appropriate consumers quickly.

For example, an information searching person (furniture vendor) can grasp a specific information disclosing person or persons provided with a child's blanket, by using commodity provision information (child's blanket) as a key, whereby the information searching person can provide suggestions on a commodity (e.g. child's studying desk) for the specific information disclosing person or persons, so as to obtain a new customer with ease.

In addition, since personal information on the information disclosing person or persons which is provided for the information searching person is managed in accordance with information on disclosure limits, the information disclosing person or persons can protect their privacy, depending on their own decision.

Next, a description will be provided on operation of the server device 1 when the server device 1 receives commodity provision information, etc. from the information register side terminal 4, in accordance with FIG. 8. In this case, it is also possible to realize the operation of the server device 1 as described below by use of software.

First, the processing means 14 associates personal information of the information disclosing person or persons and commodity provision information (e.g. provision information on a child's blanket) and receives said associated information from the information register side terminal 4 via the communication means 8 (S301).

Next, the processing means 14 checks the received personal information with personal information stored in the personal information storage means 12 (S302).

Then, as a result of the check, if identification is achieved on the received personal information with the personal information stored in the personal information storage means 12, the processing means 14 identifies an information disclosing person of the received personal information (S303).

Thereafter, the processing means 14 registers the received commodity provision information, etc. for each identified information disclosing person in the personal information storage means 12 (S304).

As described above, according to the present system, the processing means 14 receives personal information and commodity provision information transmitted from the information register side terminal 4 and registers the commodity provision information for each information disclosing person of the received personal information, so that it is possible to automatically register commodity provision information transmitted from the information register side terminal 4 in the personal information storage means 12 at any time and any place. Thereby, the information disclosing person can be provided with a commodity (service) closely tied with commodities of the registered commodity provision information in good timing as described above. That is, the information disclosing person can be provided, in good timing, with all the commodities highly encouraging his or her desire for acquiring them, approximately at the same time.

In addition, in this case, if the information registering person not only registers commodity provision information on a commodity which is actually provided for the information disclosing person, but also registers service provision information on a service closely tied with the commodity of said commodity provision information, this can be useful for the information disclosing person since said information disclosing person can be indirectly provided with said service at the same time.

Further, according to the present system, since the commodity provision information transmitted from the information register side terminal 4 can be automatically registered in the personal information storage means 12 at any time and any place, this eliminates an inputting process of information on said commodity, resulting in significant reduction in labor. In particular, by standardization on the data structure, further significant reduction in labor can be accomplished among the enterprises and within the industry.

For example, if the information registering person not only registers commodity provision information (provision information on child's blanket), but also registers service provision information (school entrance procedure) at a time, the information disclosing person is allowed to indirectly make the school entrance procedure at the same time.

Commodity provision information, etc. according to the above mentioned system, is described by using an example in the case of the commodity provision information on commodity, and it may be applicable in the case of service provision information on service.

This way can also provide the same operational advantage as in the case of the commodity provision information as mentioned above, depending on the contents of the service provision information. Simultaneously, the information searching person can obtain the service provision information as a search result, by using the personal information on the information disclosing person as a key. Accordingly, the enterprise can grasp the service provision information, so as to realize efficiency in administrative transaction.

For example, office stuff searches personal information on an employee to obtain his or her service provision information (provision information on relocation), so that the office stuff can ensure to make a confirmation on relocation destination of the employee. Thereby, the office stuff can quickly perform a domestic transaction of changing the employee's address to the relocation destination. This case eliminates a process for documentation of changing the address to the relocation destination by the office stuff or the employee, resulting in reduction in personnel expenses, as well.

The information searching person can also make a confirmation on personal information on an information disclosing person as a search result, by using service provision information on a specific service as a key, whereby the information searching person can obtain a new customer with ease.

For example, an information disclosing person who will move to another location is likely to purchase furniture and household electric appliances, as well as to apply for subscription of the telephone line at the time of his or her moving. In this case, according to the present system, the information searching person (e.g. a furniture vendor, a household electric appliances vendor and a telephone company) can grasp a specific information disclosing person or persons who will move to another location, by using service provision information (e.g. provision information on relocation) as a key, whereby the information searching person can provide suggestions on commodities and services (e.g. furniture, household electric appliances and subscription of telephone), etc for the specific information disclosing person or persons, so as to obtain a new customer with ease.

In addition, the information registering person registers not only service provision information on service which is actually provided for the information disclosing person or persons, but also registers another service provision information on service closely tied with the service of said service provision information at a time, whereby, the information disclosing person can be indirectly provided with said closely tied service at the same time.

For example, if the information registering person not only registers a provision of moving (service provision information), but also registers a procedure for changing the address to the relocation destination at an public office (service provision information) at a time, the information disclosing person is allowed to indirectly perform the procedure for changing the address to the relocation destination at the public office at the same time. It is also possible in the case of procedure for school transfer.

The present embodiment may, for example, use a system using WAN (Wide-Aria-Network) instead of the Internet. The present embodiment may comprise a plurality of information disclosure side terminals 2, information search side terminals 3 and information register side terminals 4, depending on the number of users. Further, the present embodiment may use wireless communications instead of wired communications. Furthermore, the data structure of personal information and commodity provision information uses XML, and may use HTML, etc. alternatively.

The above-mentioned methods can provide the same operational advantage as in the case of FIG. 1 as described above, depending on the contents of commodity provision information, etc.

[Other Modification]

A personal information storage means 12 stores an information catalog including commodity information, etc., and a processing means 14 identifies commodity information, etc. which has been selected at an information register side terminal 4 from a plurality of commodity information, etc. stored in the personal information storage means 12. In this case, "commodity information, etc" widely includes anything which can be an object for commercial transactions, regardless of commodity or service. "Commodity Information, etc" can refer, for example, to information pertinent to furniture and lighting fixtures, etc. The rest of the constitution is the same as in the case of FIG. 1 as described above.

This way enables an information registering person to select appropriate commodities, etc. from the information catalog, so that the information registering person can provide an information disclosing person with an coordination of all the commodities, etc. pertinent to a commodity, etc. which is actually provided for the information disclosing person, indirectly providing those coordinated commodities at the same time.

For example, a real estate agent can provide a prospective tenant not only with a house but also with furniture and lighting fixtures selected from the information catalog at a time. Therefore, the prospective tenant can move to a new house equipped with furniture and lighting fixtures.

INDUSTRIAL APPLICABILITY

Since the present invention has such constitutions and functions as described above, it is allowed, first, to identify an information disclosing person in accordance with personal information on the information disclosing person transmitted from an information search side terminal; and to transmit commodity provision information, etc. on commodity service which is provided for the identified information disclosing person, whereby an information searching person can provide the identified information disclosing person with commodities highly encouraging his or her desire for acquiring them in good timing.

In addition, according to commodity provision information, etc. transmitted from the information search side terminal, it is also allowed to identify an information disclosing person or persons associated with said commodity provision information, etc., and to transmit the personal information on the identified information disclosing person or persons, so that the information searching person can ensure to provide the information disclosing person or persons with only commodity service highly interesting them, whereby the information searching person can acquire a new contractor. In particular, within industries having strong ties with each other, it is useful to obtain commodity provision information, etc. from other industries because they can grasp appropriate consumers quickly.

In addition, commodity provision information, etc. transmitted from the information register side terminal is registered for each information disclosing person of the personal information, so that the information disclosing person can be provided, in good timing, with a plurality of commodity services highly encouraging their desire for acquiring them approximately at the same time.

Further, a manufacture, a sales vendor, a service trader, a self-governing body and an education foundation, as an information searching person, can ensure to grasp personal information on the information disclosing person and commodity provision information, etc. associated with the information disclosing person or persons.

Furthermore, personal information on the information disclosing person is managed in accordance with information on disclosure limits, so as to protect the privacy of the information disclosing person.

In this way, it is possible to provide an unprecedentedly excellent personal information utilization system and personal information utilization program, which can accomplish improvement in quality of service while utilizing personal information, etc. among any different industries interactively.

The invention claimed is:

1. A personal information utilization system comprising:
   a personal information storage means;
   a communication means; and
   a processor configured for controlling operation of the personal information storage means and the communication means, said personal information storage means storing personal information of a plurality of information disclosing persons and storing first commodity provision information pertaining to a first commodity provided to at least one of the plurality of information disclosing persons by a first commodity provider, and the processor further configured for:
   a) receiving second commodity provision information from a second commodity provider that is different than the first commodity provider, the second commodity provision information received from an information search side terminal via said communication means, the second commodity provision information including at least one of an attribute of the first commodity or information pertinent to providing the first commodity;
   b) checking said received second commodity provision information against the first commodity provision information;
   c) identifying, as a result of said checking, at least one specific information disclosing person from the plurality of information disclosing persons, the at least one specifically identified information disclosing person associated with said first commodity provision information, said identifying by using the second commodity provision information as a key such that the second commodity provision information at least partially coincides with the first commodity provision information;
   d) reading out at least a portion of the personal information of said at least one specifically identified information disclosing person from said personal information storage means; and
   e) transmitting said read out at least a portion of the personal information to said information search side terminal via the communication means.

2. A non-transitory computer-readable medium having stored thereon a personal information utilization program that, when executed by an information processing means, performs a method comprising:
   a) receiving second commodity provision information from a second commodity provider;
   b) checking the second commodity provision information against first commodity provision information pertaining to a first commodity provided to at least one of a plurality of information disclosing persons by a first commodity provider, the first commodity provider different than the second commodity provider;
   c) identifying, as a result of the checking, at least one specific information disclosing person of the plurality of information disclosing persons, the at least one specific information disclosing person associated with said first commodity provision information, said identifying by using at least a portion of the second commodity provision information as a key such that the second commodity provision information partially coincides with the first commodity provision information;
d) reading out personal information of the at least one specific information disclosing person from a personal information storage means that stores respective personal information of each of the plurality of information disclosing persons; and
e) transmitting at least a portion of said read out personal information to said second commodity provider via a communication means.

3. The personal information utilization system according to claim 1, wherein the first commodity provision information stored in said personal information storage means is such information that the processor associates personal information of at least one of the plurality of information disclosing persons and the first commodity provision information and receives said associated information from an information register side terminal via said communication means; checks said received personal information with personal information stored in said personal information storage means; identifies at least one of the plurality of information disclosing persons as associated with said received personal information, as a result of said checking, if said received personal information coincides with the personal information stored in said personal information storage means; and registers said first commodity purchasing information received for each identified information disclosing person in said personal information storage means.

4. The personal information utilization system according to claim 1, wherein said second commodity provision information is received from an information searching person, said information searching person being at least one of a manufacturer, a sales vendor, a service trader, a self-governing body or an education foundation.

5. The personal information utilization system according to claim 1, wherein the personal information of the plurality of information disclosing persons stored in said personal information storage means is such information that the processor is configured to receive information on disclosure limits representing disclosure limits for the personal information of the plurality of information disclosing persons, from the information disclosure side terminal via the communication means and that the personal information storage means is configured to manage in accordance with the received information on disclosure limits.

6. The non-transitory computer-readable medium according to claim 2, wherein the first commodity provision information stored in said personal information storage means is such information that said processing means is configured to associate personal information of at least one of the plurality of information disclosing persons and the first commodity provision information; and to receive said associated information from an information register side terminal via said communication means; to check said received personal information with personal information stored in said personal information storage means; to identify at least one of the plurality of information disclosing persons associated with said received personal information as a result of said checking, if said received personal information coincides with the personal information stored in said personal information storage means; and to register said first commodity purchasing information received for each identified information disclosing person in said personal information storage means.

7. The non-transitory computer-readable medium according to claim 2, wherein said second commodity provision information is received from an information searching person, said information searching person being at least one of a manufacturer, a sales vendor, a service trader, a self-governing body or an education foundation.

8. The non-transitory computer-readable medium according to claim 2, wherein the personal information of the plurality of information disclosing persons stored in said personal information storage means is such information that the processing means is configured to receive information on disclosure limits representing disclosure limits for the personal information of the plurality of information disclosing persons, from an information disclosure side terminal via the communication means and that the personal information storage means is configured to manage in accordance with the received information on disclosure limits.

9. The personal information utilization system of claim 1, wherein the first commodity provision information is automatically registered via an information register side terminal.

10. The personal information utilization system of claim 1, wherein the first commodity provision information comprises a name of an item corresponding to the first commodity, a name of a vendor, and a date when the vendor provided the item.

11. The personal information utilization system of claim 1, wherein said identifying comprises determining an identity, previously unknown to be associated with the second commodity provision information, of the at least one specifically identified information disclosing person based on the at least partial coincidence of the first commodity provision information with the second commodity provision information.

12. The personal information utilization system of claim 1, wherein the first commodity provision information comprises a name of the first commodity.

13. The personal information utilization system of claim 1, wherein at least one of the first commodity provided by the first commodity provider or a second commodity provided by the second commodity provider comprises a service.

14. The non-transitory computer-readable medium of claim 2, wherein at least one of the first commodity provided by the first commodity provider or a second commodity provided by the second commodity provider comprises a service.

15. The non-transitory computer-readable medium according to claim 2, wherein the second commodity provision information comprises an attribute of the first commodity and information pertinent to providing the first commodity.

16. The non-transitory computer-readable medium according to claim 15, wherein the information pertinent to providing the first commodity comprises a name of a vendor of the first commodity and a date when the vendor provided the first commodity.

17. The non-transitory computer-readable medium according to claim 2, wherein the second commodity provision information is received from an inform.

* * * * *